(12) United States Patent
Jakobsson et al.

(10) Patent No.: US 6,950,937 B2
(45) Date of Patent: Sep. 27, 2005

(54) SECURE DISTRIBUTED COMPUTATION IN CRYPTOGRAPHIC APPLICATIONS

(75) Inventors: Bjorn Markus Jakobsson, Hoboken, NJ (US); Susanne Gudrun Wetzel, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 778 days.

(21) Appl. No.: 09/867,935

(22) Filed: May 30, 2001

(65) Prior Publication Data

US 2003/0046547 A1 Mar. 6, 2003

(51) Int. Cl.$^7$ .............................. H04L 9/00; H04K 1/10
(52) U.S. Cl. ...................... 713/180; 713/176; 713/177; 380/37; 380/42
(58) Field of Search ................................ 713/176, 177, 713/180; 380/37

(56) References Cited

U.S. PATENT DOCUMENTS

| | | | | |
|---|---|---|---|---|
| 4,759,063 A | * | 7/1988 | Chaum ........................ | 380/30 |
| 5,878,140 A | * | 3/1999 | Chaum ........................ | 705/74 |
| 6,049,613 A | * | 4/2000 | Jakobsson .................... | 380/47 |
| 6,061,449 A | * | 5/2000 | Candelore et al. ............ | 380/28 |
| 6,278,783 B1 | * | 8/2001 | Kocher et al. ............... | 380/277 |
| 6,327,661 B1 | * | 12/2001 | Kocher et al. .............. | 713/193 |
| 6,389,136 B1 | * | 5/2002 | Young et al. ................. | 380/28 |
| 6,772,339 B1 | * | 8/2004 | Jakobsson et al. .......... | 713/168 |
| 2001/0002486 A1 | * | 5/2001 | Kocher et al. .............. | 713/171 |

FOREIGN PATENT DOCUMENTS

EP      1043862 A2  * 10/2000  ............. H04L/9/08

OTHER PUBLICATIONS

J. Bos et al., "Addition Chain Heuristics," Proceedings of CRYPTO '89, pp. 400–407.

M. Abadi et al., "On Hiding Information from an Oracle," Journal of Computer and System Sciences, vol. 39, No. 1, pp. 1–29, Aug. 1989.

M. Ballare et al., "Fast Batch Verification for Modular Exponentiation and Digital Signatures," Proceedings of EUROCRYPT '98, pp. 1–27, Jun. 1998.

V. Boyko et al., "Speeding up Discrete Log and Factoring Based Schemes via Precomputations," Proceedings of EUROCRYPT '98, 15 pages, 1998.

National Institute of Standards and Technology (NIST), "FIPS Publication 186–2: Digital Signature Standard," Jan. 2000.

E.M. Rains et al., "Table of Constant Weight Binary Codes," http://www.research.att.com/~njas/codes/Andw/?, pp. 1–21, 2000.

* cited by examiner

*Primary Examiner*—Kambiz Zand (57) ABSTRACT

An exponentiation operation or other computational task associated with a cryptographic protocol is performed in a secure distributed manner using multiple machines, e.g., a client device and multiple servers of a computer network. The computational task is transformed by an originator machine before being sent to one or more external servers for execution. The transformation may include replication and dependency operations to provide robustness to errors in the computations performed by the external servers, and blinding and permutation operations to provide privacy for secret information associated with the computational task. The transformed computational task is executed by the one or more external servers, and the results of the transformed computational task are transmitted back to the originator machine. The originator machine transforms the results of the transformed computational task in a manner which permits verification that the one or more results are appropriate results for a given input. Advantageously, the invention can operate with arbitrary inputs, and provides improved computational efficiency relative to conventional techniques for both small and large batches of cryptography-related computations.

19 Claims, 5 Drawing Sheets

SECURE DISTRIBUTED COMPUTATION IN CRYPTOGRAPHIC APPLICATIONS

FIELD OF THE INVENTION

The invention relates generally to cryptographic techniques which may be implemented in computer networks or other types of information processing systems, and more particularly to techniques for performing computations such as exponentiation in a secure distributed manner within such systems.

BACKGROUND OF THE INVENTION

Exponentiation is a fundamental operation in many cryptographic applications, including multi-party public key encryption, decryption and digital signature protocols. Exponentiation is also an expensive operation in terms of the computational resources that it requires. For example, using standard window-based methods, about 200 modular multiplications are typically required per exponentiation for exponent sizes of around 160 bits. There are a number of known techniques that attempt to improve the computational efficiency of exponentiation. However, such techniques have generally only been successful in providing an improvement for so-called large batches of computations, which typically include many thousands of similar computations. More specifically, amortization techniques such as those described in J. Bos and M. Caster, "Addition Chain Heuristics," Proceedings of CRYPTO '89, pp. 400–407, which is incorporated by reference herein, are particularly efficient for performing exponentiation in large batches.

Unfortunately, these and other techniques have been unable to provide significant improvements over the above-noted window-based methods for small batches of computations. These small batches of computations are typically associated with cryptographic applications involving smart cards and other devices having limited computational and memory resources.

It is also known in the art to utilize distributed servers to assist in performing cryptography-related computations. Examples of such techniques are described in M. Abadi, J. Feigenbaum and J. Kilian, "On Hiding Information From an Oracle," Journal of Computer and System Sciences, Vol. 39, No. 1, pp. 21–50, August 1989, and M. Ballare, J. A. Garay and T. Rabin, "Fast Batch Verification for Modular Exponentiation and Digital Signatures," Proceedings of EUROCRYPT '98, pp. 236–250, both of which are incorporated by reference herein.

Other known techniques are described in V. Boyko, M. Peinado and R. Venkatesan, "Speeding up Discrete Log and Factoring Based Schemes via Precomputations," Proceedings of EUROCRYPT '98, pp. 221–235, which is incorporated by reference herein.

The above-noted conventional techniques exhibit significant drawbacks. For example, those described in the above-cited V. Boyko et al. reference generally require that the input exponents for which computation is to be performed exhibit a particular near-random distribution. These techniques are therefore not appropriate for computations involving arbitrary input values.

It is apparent from the foregoing that a need exists in the art for techniques for performing exponentiation and other computational tasks utilizing arbitrary input values and in a manner that can provide improvements over conventional techniques for both small batches and large batches of computations.

SUMMARY OF THE INVENTION

The present invention provides methods and apparatus for secure distributed performance of exponentiation or other computational tasks in cryptographic applications.

In accordance with one aspect of the invention, an exponentiation operation or other computational task associated with a cryptographic protocol is performed in a secure distributed manner using multiple machines, e.g., a client device and multiple servers of a computer network. The computational task is transformed by an originator machine before being sent to one or more external servers for execution. The transformation may include replication and dependency operations to provide robustness to errors in the computations performed by the external servers, and blinding and permutation operations to provide privacy for secret information associated with the computational task. The transformed computational task is executed by the one or more external servers, and the results of the transformed computational task are transmitted back to the originator machine. The originator machine transforms the results of the transformed computational task in a manner which permits verification that the one or more results are appropriate results for a given input.

Advantageously, the present invention can operate with arbitrary inputs, and thus avoids the problems associated with conventional techniques that require inputs having a particular near-random distribution. In addition, the invention provides a substantial reduction in computational complexity for small batches of computations relative to the above-noted window-based methods. The invention can also provide reductions in computational complexity for large batches of computations relative to the above-noted amortization techniques.

DETAILED DESCRIPTION OF THE INVENTION

The present invention will be illustrated below in conjunction with an example information processing system in which the secure distributed computation techniques of the invention are implemented over the Internet or other type of communication network in conjunction with a digital signature protocol. It should be understood, however, that the invention is more generally applicable to any type of electronic system or device application in which it is desirable to provide secure distributed computation. For example, although particularly well suited for use with computer communications over the Internet or other computer networks, the invention can also be applied to numerous other information processing applications, including applications involving information transmission over wireless networks using wireless devices such as mobile telephones or personal digital assistants (PDAs), and involving other types of client devices such as smart cards and smart card readers.

Figure 1:
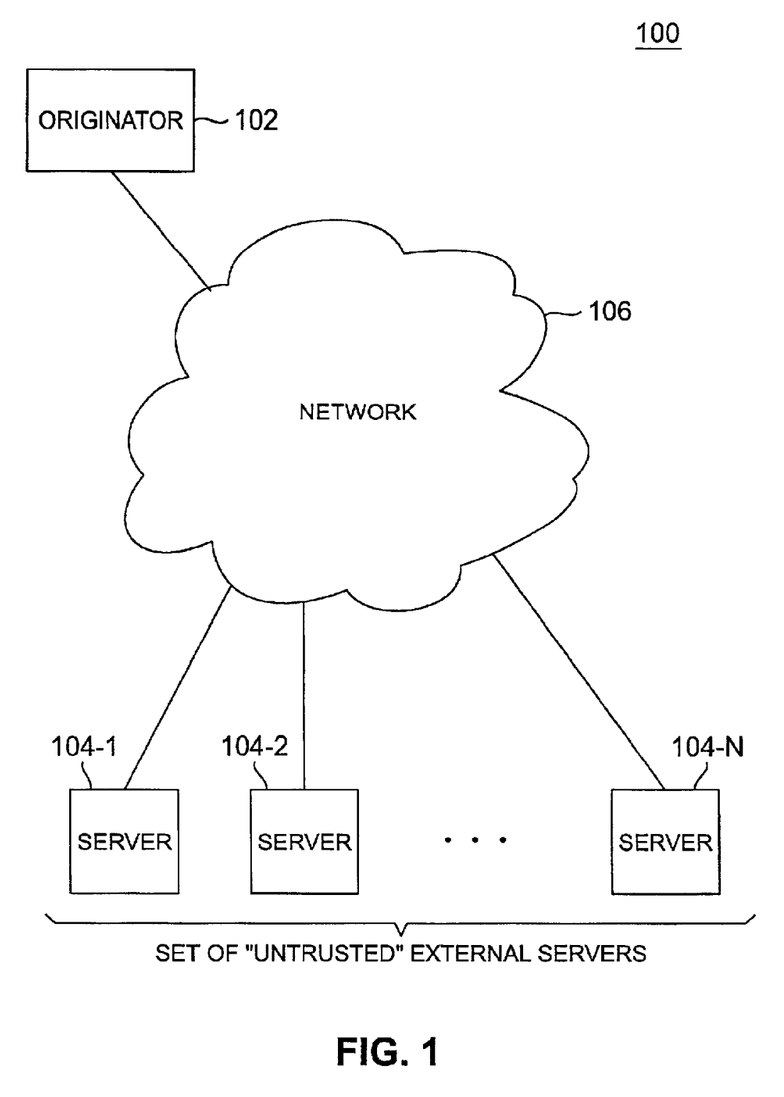
FIG. 1 shows an illustrative embodiment of an information processing system configured to provide secure distributed computation in accordance with the invention.

FIG. 1 shows an exemplary system 100 in which the secure distributed computation techniques of the invention are implemented. The system 100 includes an originator 102 which communicates with a set of servers 104 over a network 106. More particularly, the system 100 as shown includes a set of N servers 104-1, 104-2, . . . 104-N, each coupled to the network 106. As will be described in greater detail below in conjunction with FIG. 3, the originator 102 performs computational task transformation and corresponding results transformation operations of a secure distributed computation process of the present invention. The originator 102 may be viewed in this embodiment as a client device, or alternatively as another server coupled to the network 106.

The set of servers 104 may be viewed as a set of "untrusted" external servers that perform computational tasks at the request of the originator 102. These servers are untrusted in that they are assumed to be accessible to an adversary that may attempt to perform attacks on the security of the computations, e.g., may attempt to obtain a secret key of the originator used in a digital signature protocol or otherwise attempt to obtain unauthorized access to information, or may attempt to corrupt the computations performed by the servers in a manner that is not detectable by the originator. The servers 104 are considered external relative to originator 102 in that they represent computational resources not directly available within the originator 102. The resources of the originator 102 are considered local resources in this embodiment.

Each of the elements 102 and 104 is more generally referred to herein as a "machine." It should be understood that the term "machine" as used herein is intended to include any type of processing system or device capable of performing at least a portion of a secure distributed computation process in accordance with the invention.

Element 102 if implemented as a client device may be one or more desktop or portable personal computers, mobile telephones, PDAs, television set-top boxes or any other types of devices capable of transmitting or receiving information over network 106.

The term "computer" as used herein is intended to be construed generally so as to include any of the above-noted client devices, any of the servers, or combinations of one or more of the client devices and one or more of the servers.

The network 106 may be a local area network, a metropolitan area network, a wide area network, a global data communications network such as the Internet, a private "intranet" network, an "ad-hoc" network or any other suitable data communication medium, as well as portions or combinations of such networks or other communication media.

It should be understood that although particular arrangements of originator 102 and servers 104 are shown in the FIG. 1 embodiment, the invention is more generally applicable to any number, type and arrangement of different client devices and servers.

Figure 2:
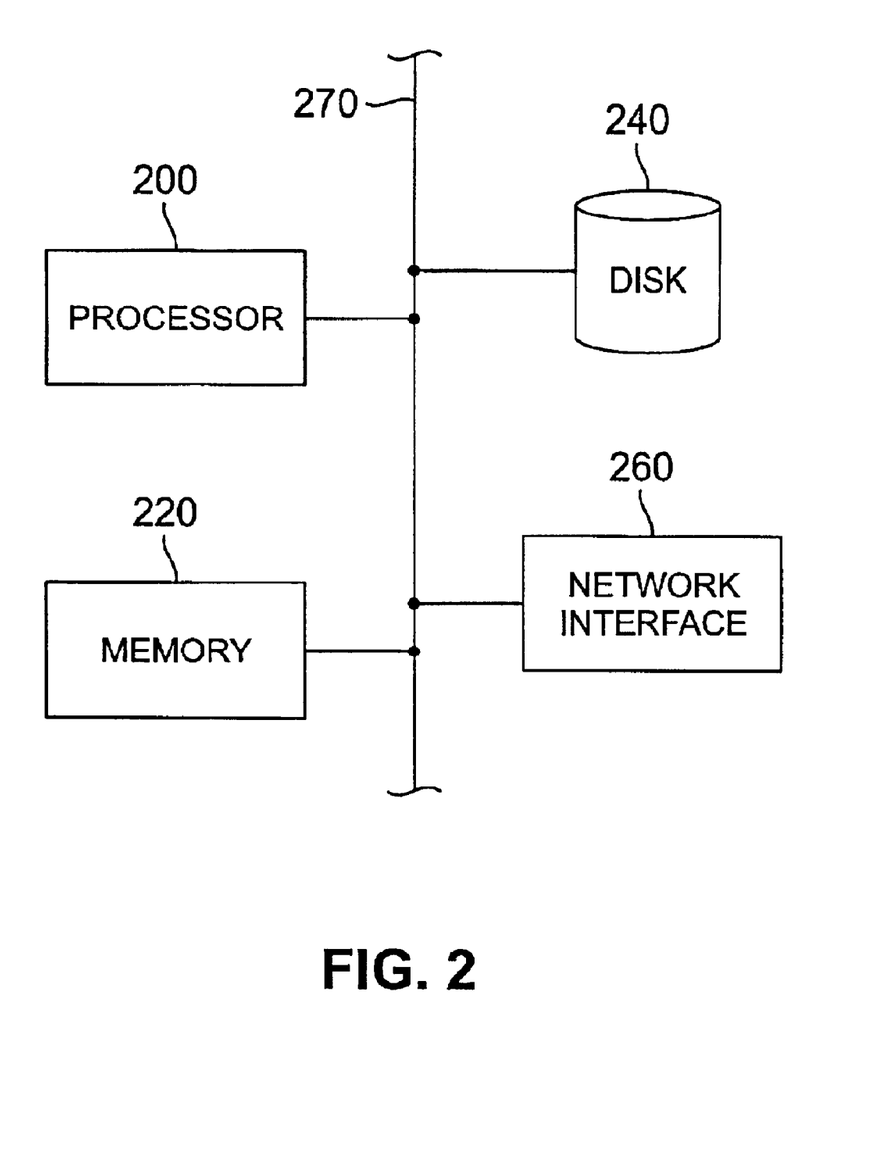
FIG. 2 is a block diagram of one possible implementation of a given one of the elements of the system of FIG. 1.

FIG. 2 shows one possible implementation of a given one of the originator 102 or servers 104 of system 100. The implementation in FIG. 2 may thus represent one or more of the elements 102 and 104, as well as portions of these elements. This implementation includes a processor 200, an electronic memory 220, a disk-based memory 240, and a network interface 260, all of which communicate over a bus 270. One or more of the processing elements of system 100 may thus be implemented as a personal computer, a mainframe computer, a computer workstation, a smart card in conjunction with a card reader, or any other type of digital data processor as well as various portions or combinations thereof. The processor 200 may represent a microprocessor, a central processing unit, a digital signal processor, an application-specific integrated circuit (ASIC), or other suitable processing circuitry. It should be emphasized that the implementation shown in FIG. 2 is simplified for clarity of illustration, and may include additional elements not shown in the figure. In addition, other arrangements of processing elements may be used to implement one or more of the elements of the system 100.

The elements 102 and 104 of system 100 execute software programs in accordance with the invention in order to provide secure distributed computation in a manner to be described in detail below. The invention may be embodied in whole or in part in one or more software programs stored in one or more of the element memories, or in one or more programs stored on other machine-readable media associated with one or more of the elements of the system 100.

Figure 3:
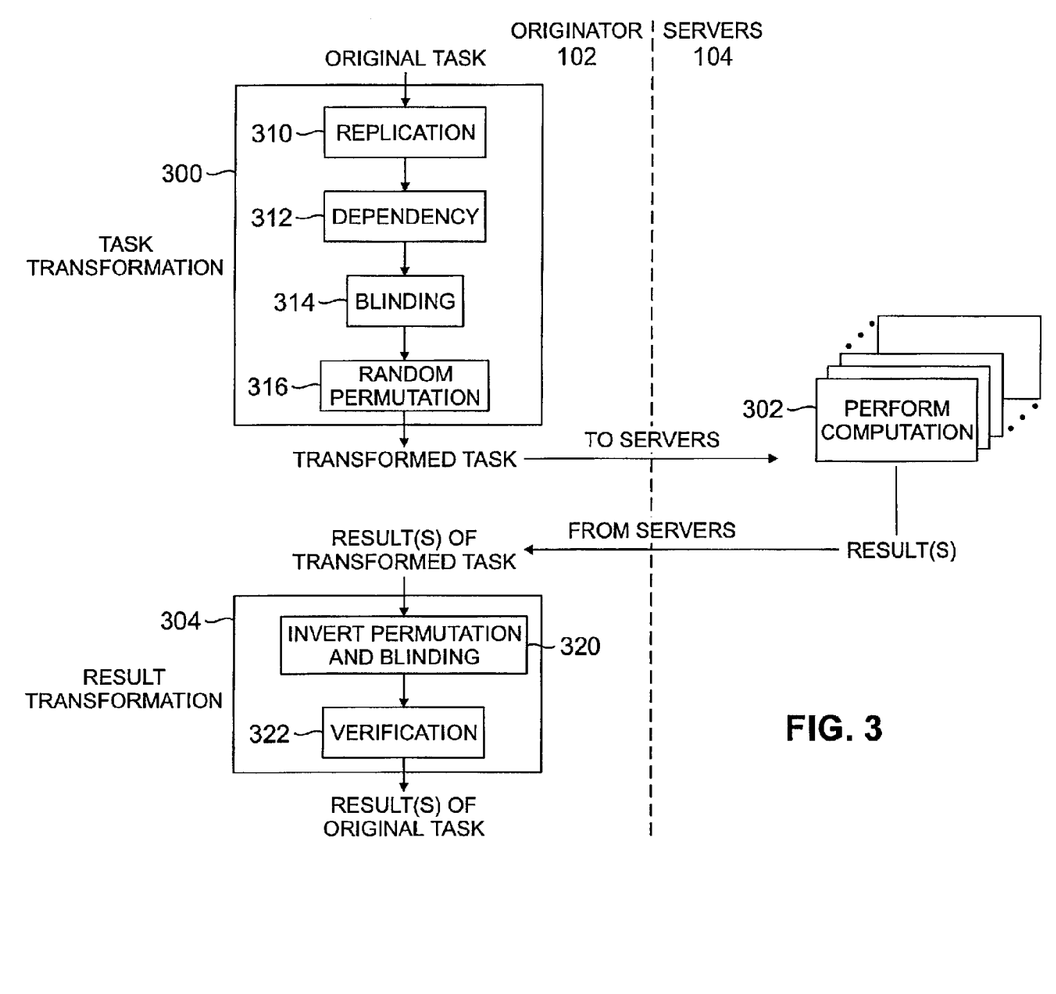
FIG. 3 illustrates a secure distributed computation process that is implemented in the system of FIG. 1 in accordance with the invention.

FIG. 3 illustrates an embodiment of a secure distributed computation process that is implemented in the system 100 of FIG. 1 in accordance with the present invention. The figure is divided by a vertical dashed line into operations performed by the originator 102 and operations performed by the servers 104. The process includes task transformation 300, computation performance 302 and result transformation 304. The task transformation 300 and result transformation 304 are carried out by the originator 102 in this embodiment, while the computation performance 302 is carried out by the servers 104.

In task transformation 300, the originator 102 receives an original computational task as input and performs a replication operation 310, a dependency operation 312, a blinding operation 314 and a random permutation operation 316 as shown. Examples of the operations 310, 312, 314 and 316 suitable for a digital signature protocol will be described in greater detail below in conjunction with FIGS. 4, 5, 6 and 7, respectively. These operations are configured such that the servers 104 are unable to derive secret information from or otherwise undermine the computations to the detriment of the originator 102.

The resulting transformed task is delivered over network 106 to one or more of the servers 104, which perform the computation as indicated at 302. One or more results of the computation are delivered from the server or servers via network 106 back to the originator 102, which then performs the result transformation 304.

In the result transformation 304, the originator processes the result(s) of the transformed task using invert permutation and invert blinding operation 320, followed by a verification operation 322. Examples of these operations for the digital signature protocol will also be described in greater detail below. The output of the result transformation 304 represents the results of the original input computational task.

The invention will now be illustrated in greater detail using a particular type of computational task associated with the generation of digital signatures in accordance with the Digital Signature Algorithm (DSA), described in National Institute of Standards and Technology (NIST), "FIPS Publication 186-1: Digital Signature Standard," Dec. 15, 1998, which is incorporated by reference herein. It should be understood, however, that the use of DSA signature generation to illustrate the invention is by way of example only. Those skilled in the art will recognize that the techniques of the invention are more generally applicable to a wide variety of other types of cryptographic computations.

The above-noted DSA signature generation is characterized by a large amount of exponentiation. More particularly, one of the computational tasks associated with DSA signature generation is to compute $r=g^k \bmod p$, where g denotes a generator, k is a secret key $\in Z_q$, and p and q are primes such that $p=lq+1$, and where $|p|=1024$, $|q|=160$. In accordance with the invention, this computational task is transformed by the originator 102, the transformed task is then sent to the external servers 104 for computation, and finally the results sent back to the originator by the external servers are transformed by the originator to obtain the desired results of the original task. The originator 102 in this example is also referred to as the "signer" of the digital signature. In the description below relating to performance of this computational task for DSA digital signatures, all operations are assumed to be performed modulo p, where applicable, unless otherwise noted.

The following is a general description of the task transformation techniques utilized in the illustrative embodiment of FIG. 3 to ensure that the above-noted example computational task can be performed in a secure manner by the set of untrusted external servers 104 in system 100. This general description will be followed by a description of more specific implementations for large batches and small batches.

1. Replication (Operation 310 in FIG. 3). Instead of delegating a given computational task one time to the external servers, the task is delegated $\tau$ times. Since each task is delegated $\tau$ times, both local and external costs increase by a factor $\tau$, not including minor amortization gains.

2. Dependency (Operation 312 in FIG. 3). Including dependencies in the transformed computations performed by the external servers leads to error propagation, which reduces the success probability of attacks in which an adversary provides incorrect results. Dependency when used in combination with replication allows detection of errors and malicious results. Dependencies can be implemented by "linking" tasks to one another, e.g., making one result depend on two or more other results, which may in turn depend on others. By way of example, dependencies can be introduced by transforming a computational task involving the exponents $k_1, \ldots, k_n$ to a task involving the exponents $k'_1, \ldots, k'_n$, where $$k'_1 = \begin{cases} k_1 & : i = 1 \\ k_i + \alpha \cdot k_{i-1} + \beta \cdot k'_{i-1} \bmod q & : 1 < i \le n \end{cases}$$

where $\alpha, \beta \in \{-1, 0, 1\}$. Depending on the values of $\alpha$ and $\beta$, different levels of error propagation can be achieved. While error propagation is very useful for detecting forgery, it also requires recomputation of many exponentiations. For efficiency reasons, dependency is preferably utilized in conjunction with other mechanisms as in the FIG. 3 embodiment. It should be emphasized that, as noted above, more than two results may be linked together in a given dependency. A generalized formula for this type of dependency is as follows:

$$k'_i = \alpha_i \cdot k_i + \sum_{j=1}^{i-1} (\beta_{ij} \cdot k_j + \gamma_{ij} \cdot k'_j),$$

where $\alpha_i$, $\beta_{ij}$ and $\gamma_{ij}$ are in $Z_q$.

As another example, the dependencies can be introduced on blocks of size $b \le n$ where $b \cdot b' = n$, as follows:

$$k'_i = \begin{cases} k_i & : i = l \cdot b + 1 \\ k_i + \alpha \cdot k_{i-1} + \beta \cdot k'_{i-1} \bmod q & : l \cdot b + 1 < i \le (l+1) \cdot b \end{cases}$$

for $1 \le l \le b'$.

Dependency and replication represent examples of error detection and correction techniques that may be utilized in conjunction with the invention. Other examples of such techniques include checksums and insertion of known values. Such techniques are more generally referred to herein as "error-related operations," since these techniques when utilized permit detection and/or correction of errors in computations performed by the external servers.

Checksums are values that depend on subsets of other values, and which are checked by multiplying the other values together and comparing to the corresponding checksum values. It is generally an expensive operation to verify the checksums, requiring roughly one multiplication per item selected for the checksum. However, checksums can be used as a recovery method to locate good sections of a corrupted set of computed values, and are therefore beneficial given the negligible precomputation costs of the operation.

With regard to known values, the originator may insert into a batch of computations to be delegated a number w of simple tasks having known results. For example, x=0, resulting in $g^x=1$. Such simple computational tasks cannot be distinguished from other tasks once they are blinded. This allows the detection of so-called offset attacks, in which the adversary correctly computes all tasks, and then offsets all of the replies using the same multiplicative offset. Both the additional local and external costs associated with insertion of known values are negligible.

These and other error detection and correction techniques may be used in conjunction with or in place of replication and dependency a given embodiment of the invention.

3. Blinding (Operation 314 in FIG. 3). Blinding can be implemented by applying a random and secret offset to each exponentiation in a given batch of computations. The offsets may be selected in a particular manner in order to keep the costs of the operation down, as will be described in more detail below. The additional local cost incurred by blinding includes a first cost associated with applying the offsets to the exponents, and a second cost associated with removing the resulting offsets from the results returned by the external servers. The blinding does not affect the amount of computation to be performed by the external servers.

The blinding for the exponent vector $(k_1, \ldots, k_n)$ may be implemented by first choosing e random numbers $$r_1, \ldots r_e \in \left\{0, \ldots, \frac{q-1}{2}\right\}.$$

Then, for each exponent $k_j$ with $1 \le j \le n$, d elements are chosen and the new exponents are computed as $$k'_j = k_j - \sum_{i=1}^{e} \gamma_{i,j} r_i \bmod q$$

where $\gamma_{i,j} \in \{0, 1\}$ and $$\sum_{i=1}^{e} \gamma_{i,j} = d.$$

It is important not to select two equal sets of blinding values for combination, since the resulting blinded elements could be canceled by random guessing and thereby leak the secret key. Instead, one may select the blinding values by enumeration over all sets with a particular minimum Hamming distance, where the Hamming distance of two sets $S_1$, $S_2$ is defined as the number of elements of $(S_1 \cup S_2)/(S_1 \cap S_2)$. The Hamming distance in turn determines how many portions have to be combined by the adversary in order to cancel blinding elements. The sets of blinding elements form a so-called constant weight code with length n and weight d. Additional details regarding such codes are described in, e.g., J. H. Conway et al., "Sphere Packings, Lattices and Groups," Springer, 1993, and E. M. Rains et al., "Table of Constant Weight Binary Codes," http://www.research.att.com/~njas/codes/Andw/, 2000, which are incorporated by reference herein. Computing the actual signatures corresponding to the exponents $k_1, \ldots, k_n$ requires the computation of $$g^{\sum_{i=1}^{e} \gamma_{i,j} r_i \bmod q}$$

for $1 \leq j \leq n$ by the signer. Using standard methods, $g^{r_i}$ for $1 \leq i \leq e$ can be computed with $\approx 200$ multiplications and the precomputation of all possible pairs $g^{r_i + r_j \bmod q}$ with $1 \leq i < j \leq e$ requires $$\leq \frac{e(e-1)}{2}$$

multiplications. Thus, the additional costs for the signer computing the original signature amount to $$\approx 1 + \left(\left\lceil \frac{d}{2} \right\rceil - 1\right) + \frac{1}{n}\left(200e + \frac{e(e-1)}{2}\right).$$

4. Permutation (Operation 316 of FIG. 3). The order of computational tasks sent to the external servers can be randomly permuted within a given batch of tasks. Permutation is helpful as it forces the adversary to guess what exponentiations correspond to what digital signature. The costs incurred by the originator to perform this operation are insignificant. The permutation does not affect the amount of computation to be performed by the external servers.

A more specific implementation particularly well suited for us with large batches of computations will now be described with reference to FIGS. 4, 5, 6 and 7. Such large batches are typical in Internet-based implementations of the system 100 of FIG. 1.

Assume for this example implementation that the input to the task transformation 300 of FIG. 3 comprises a vector $((g, k_1), \ldots, (g, k_n))$ corresponding to an implicit request to compute $(g^{k_1}, \ldots, g^{k_n})$. This input is denoted herein by a vector $G_1 = (k_1, \ldots, k_n)$ and represents computational task for the DSA digital signature protocol. The signer (originator 102) transforms the original computational task $G_1$ using replication operation 310, dependency operation 312, blinding operation 314 and permutation operation 316 of FIG. 3.

Figure 4:
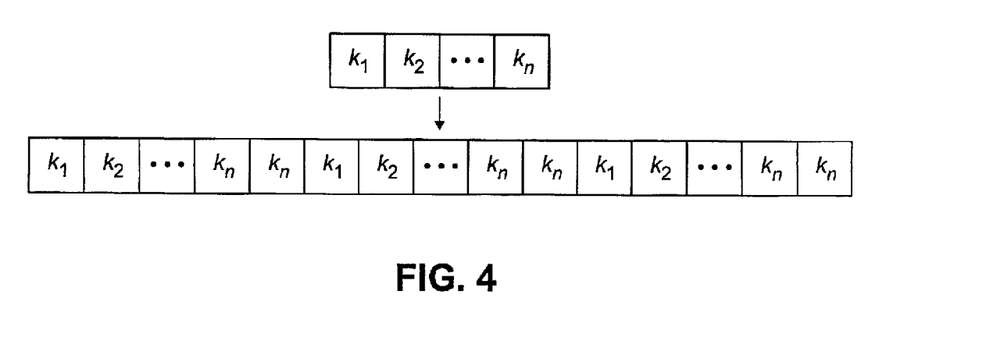
FIGS. 4, 5, 6 and 7 illustrate example replication, dependency, blinding and permutation operations, respectively, of the FIG. 3 process.

FIG. 4 illustrates the replication operation 310 in greater detail. In this operation, the vector $G_1$ is first extended by replicating the last element thereof, i.e., $k_{n+1} = k_n$. Then, the resulting extended vector is repeated three times as shown. More specifically, the original vector $G_1 = (k_1, \ldots, k_n)$ is transformed into a new vector $$G_2 = (k_1, \ldots k_n, k_{n+1}, k_1, \ldots, \ldots, k_n, k_{n+1}, k_1, \ldots, k_n, k_{n+1}).$$

Figure 5:
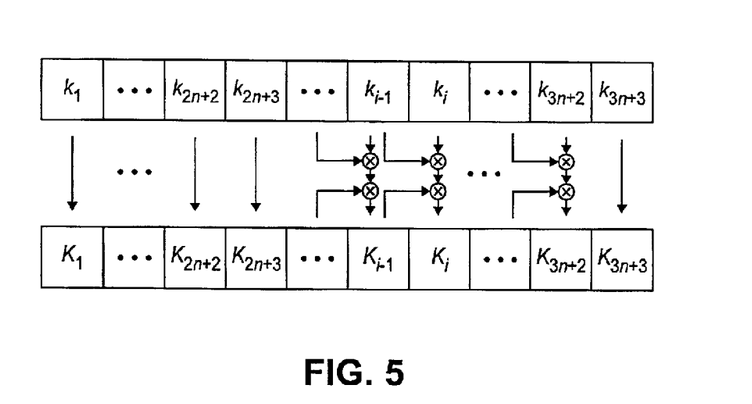

FIG. 5 illustrates the dependency operation 312 in greater detail. In this operation, dependency is introduced by transforming the third part of the vector $G_2$ yielding $$G_3 = (K_1, \ldots, K_{3n+3})$$

where $K_i = (G_2)_i$ for $1 \leq i \leq 2n+2$ and for $2n+3 \leq i \leq 3n+3$ the $K_i$ are inductively defined as $$K_i = \begin{cases} k_1 & : i = 2n+3 \\ k_i - k_{i-1} - K_{i-1} \bmod q & : 2n+3 < i \leq 3n+2 \\ K_{i-1} & : i = 3n+3 \end{cases}$$

It should be noted that these dependencies can also be interpreted as checksums, and so there is no need to introduce additional checksums.

Figure 6:
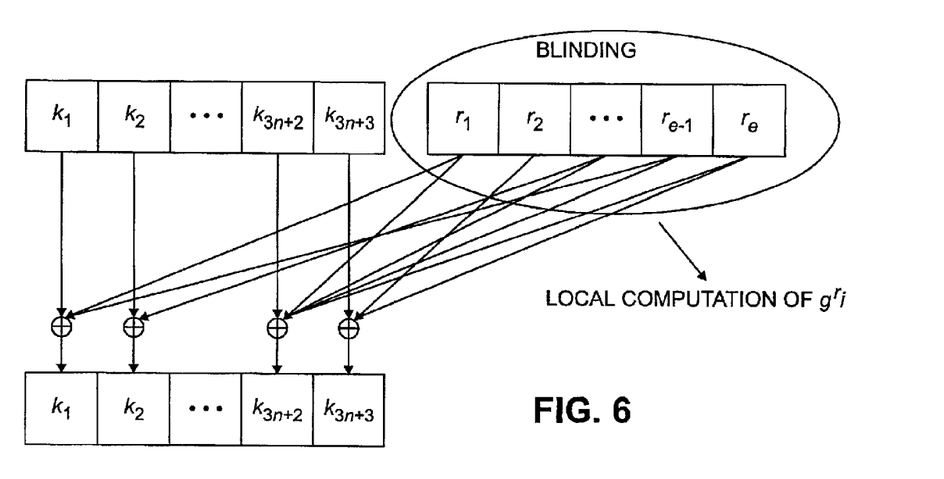

FIG. 6 illustrates the blinding operation 314 in greater detail. In this operation, e random numbers $$r_1, \ldots, r_e \in \left\{0, \ldots, \frac{q-1}{2}\right\}$$

are picked. Then, for each element of the vector $G_3$, 4 elements $\rho_{1,(G3)i}, \ldots, \rho_{4,(G3)i}$ are selected from $R = \{r_1, \ldots, r_e\}$ in the manner previously described and a new vector $$G_4 = (\kappa_1, \ldots, \kappa_{3n+3})$$

is computed as $$\kappa_i = (G_3)_i - \sum_{j=1}^{4} \rho_{j,(G3)_i} \bmod q \text{ for } 1 \leq i \leq 3n+3.$$

for $1 \leq i \leq 3n+3$.

Figure 7:
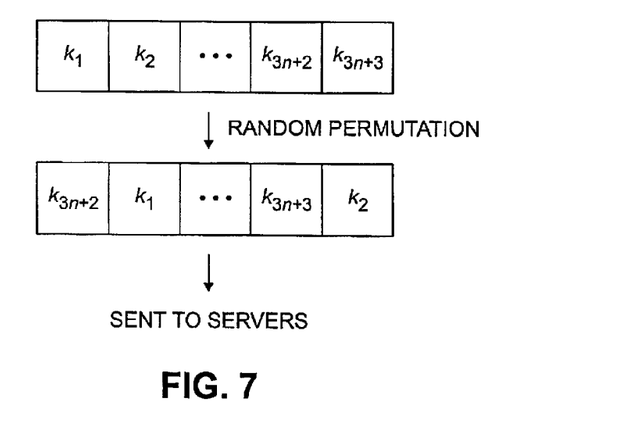

FIG. 7 illustrates the random permutation operation 316 in greater detail. In this operation, a permutation $\Pi$ on the vector $G_4$ is selected uniformly at random, resulting in a new vector $$G_5 = \Pi(G_4)$$

The vector $G_5$ may be broken up into blocks of appropriate size, and communicated to the external servers. It should be noted that the generator value g need only be communicated once. In this embodiment, if a vector $(A_1, \ldots, A_k)$ is sent to a given computing server in the set of servers 104, the latter is expected to compute and return the vector $(g^{A_1}, \ldots, g^{A_k})$.

The result transformation 304 in this implementation is performed as follows. It is assumed that the input to result transformation 304 is a vector $G_6$ whose elements comprise the values returned by the external servers, arranged in the order in which the corresponding computation requests were sent to the external servers, so that a reply to a given portion of a request is entered in the same position from which that portion was taken. As noted previously, result transformation 304 includes invert operation 320 and verification operation 322.

Operation 320 of result transformation 304 performs inverse permutation and inverse blinding operations. In the inverse permutation operation, the signer constructs a new vector by applying an inverse of the permutation applied in step 316 of the task transformation 300. This results in the vector $$G_7 = \Pi^{-1}(G_6)$$

In the inverse blinding operation, for each $1 \leq i \leq 3n+3$, the signer computes $$(G_8)_i = g^{(G_7)_i + \sum_{j=i}^{4} p_{j,i}(G_3)_i} \bmod q$$

thus resulting in a vector $G_8$. This computation may be performed using well-known conventional methods for addition chains.

Verification operation 322 verifies the dependencies introduced in operation 312 and the replication introduced in operation 310. More particularly, operation 322 determines if $(G_8)_{n+2} = (G_8)_{2n+3}$, $(G_8)_n = (G_8)_{n+1}$, $(G_8)_{2n+1} = (G_8)_{2n+2}$ and $(G_8)_{3n+2} = (G_8)_{3n+3}$, as well as whether for $1 \leq i \leq n$ $$(G_8)_{n+1+i} = (G_8)_i.$$

In addition, for $2 \leq i \leq n$ operation 322 checks inductively whether $$(G_8)_{2n+2+i} \cdot (G_8)_{2n+i+1} \cdot (G_8)_{i-1} = (G_8)_i.$$

If so, the $(G_8)_i$ with $1 \leq i \leq n$ are the correct results of the delegated computations. Otherwise, if $1 \leq j \leq n$ is the index where the check fails, then the computations of $(G_8)_i$ with $1 \leq i < j$ are correct. The values $(G_8)_i$ with $i < j < n$ are compared with $(G_8)_{n+i+1}$. If equality holds, these values are assumed to be correct. Otherwise, recomputation will be necessary as in the case of $(G_8)_j$.

Advantageously, the above-described secure distributed computation process is private, in that it does not leak secret information, and robust, in that it does not allow incorrect computation to go undetected. Moreover, it is efficient, in that it reduces the amount of local computation to be performed given some assumptions on the probability that a computational portion is correctly performed when delegated. These advantages of privacy, robustness and efficiency can be more formally defined as follows.

Let T be a computational task, and $f$ an arbitrary function. It can said that the delegation of T is $\epsilon$-private with respect to $f$ if the adversary has only a negligible advantage $\epsilon$ in computing $f(i)$ for some input i if performing the delegated computation and seeing the public input and output of the originator, compared to a setting where the adversary only sees the public input and output of the originator. In the context of the above-described distributed computations for digital signatures, the primary concern with regard to privacy is privacy of the exponent values for the signatures, which indirectly corresponds to the privacy of the secret signing key.

It can be shown that if one selects at least e=75 blinding factors, then the above-described secure distributed computation process is $2^{-80}$-private for input sizes larger than 100,000 and smaller than $$\binom{e}{4} = \binom{75}{4} = 1215450.$$

The robustness of the process deals with a different kind of attack, namely an adversary trying to corrupt the computations. It can be said that a delegation of T is $\epsilon$-robust if an adversary who controls all the external servers performing computation for the signer cannot corrupt the computation but for a probability $\epsilon$ over all random strings of the signer and all computational tasks T.

It can be shown that, for an input size n, the secure distributed computation process is $$\left(3 \cdot \binom{3n+2}{5}\right)^{-1}$$

robust against an adversary who controls all the external servers, for large batch sizes.

Thus, for input sizes larger than 47,000 elements, an adversary has less than a probability $2^{-80}$ to corrupt the computation without detection. It can also be shown that it is necessary for an adversary to select a "coherent set" of at least six elements among the existing 3n+3 elements. Given a random distribution of the elements, the adversary can only succeed if the five last elements chosen are "coherent with" the first elements chosen, which gives the claimed probability of success.

With regard to efficiency, the primary concern is the amount of computation performed by the signer, i.e., local computations, and not with the amount of computation performed by the external servers. It can be said that a delegation of a computational task T is $(\epsilon, v)$-efficient if the computational load associated with the signer performing the computation T is a fraction $\epsilon$ of that required by the signer if outsourcing T to the external servers. This is relative to a certain fraction v of incorrect responses that are scheduled by the adversary, and where the probability is over all random strings of the signer.

It can be shown that the secure distributed computation process is approximately $$\left(\frac{5}{4}, 0\right)-$$

efficient for batches of approximately 100,000 signatures, with an actual cost per signature of 8 multiplications. This corresponds to a local efficiency improvement of 20%, compared to conventional addition chain methods.

The secure distributed computation process described in conjunction with reference to FIGS. 4, 5, 6 and 7 can be modified in a straightforward manner to accommodate small batches of signatures. Such small batches are typical in smart card based implementations of the system 100 of FIG. 1. In one such implementation, the originator 102 is a computer, PDA, wireless telephone or other device equipped with a card reader able to read a smart card, with information on the smart card used to generate digital signatures or to support other cryptographic applications.

In a small-batch smart card implementation of the process, an initial exponentiation can be performed as part of a manufacturing or initialization process of the smart card, such that pairs $(r_i, g^{r_i})$ are stored in a memory of the card. All pairs are not precomputed due to memory capacity constraints. While in such an implementation, the original vector has to be replicated seven times in order to obtain a robustness level corresponding to a probability of failure of $2^{-80}$ for a batch size of 20, the dependency is introduced as in the large-batch implementation previously described. In order to achieve a privacy level of $2^{-80}$, a cumulative batch size should be at least about 80,000. The cumulative batch size corresponds to the number of signatures that can be generated by the smart card without "recharging." Therefore, it is sufficient to use 75 blinding factors, since $$\binom{75}{4} > 80000 \cdot 9,$$

where 9 is the effect of replication and dependencies. The local cost per signature in this implementation is only 38 multiplications per signature, which is a substantial improvement relative to the approximately 200 multiplications that are needed for such small batches using conventional window-based methods. Thus, a small-batch implementation of the process illustrated in conjunction with FIGS. 4, 5, 6 and 7 is $$\left(\frac{100}{19}, 0\right)-$$

efficient, which corresponds to a 81% improvement over the conventional techniques.

As noted previously, the secure distributed computation process as described in conjunction with FIGS. 4, 5, 6 and 7 has a high degree of robustness. However, in applications in which robustness is not critical, e.g., in which a third party is employed to verify the signatures, the process can be altered to substantially reduce the costs. Similarly, if the distributed computation process is used for decryption instead of signature generation, redundancy checks of the resulting plaintexts can be used to obtain robustness at reduced costs.

It is also possible to further reduce the computational costs of the process by eliminating one or more operations such as the replication operation 310 or the dependency operation 312, with corresponding modification of the result transformation 304. It should be noted that these modifications do not alter the degree of privacy, but only the robustness.

It should be understood that the above-described embodiments of the invention are illustrative only. For example, the invention can be applied to any type of digital signature protocol and to numerous other cryptographic applications involving exponentiation or other computations suitable for delegation. These and numerous other alternative embodiments within the scope of the following claims will be apparent to those skilled in the art.

What is claimed is:

1. A method for performing a computational task associated with a cryptographic protocol in a distributed manner using a plurality of machines, the plurality of machines comprising an originator machine and at least one additional machine, the method comprising the steps of:

transforming a computational task involving a given input in the originator machine, the transforming of the computational task involving at least an error-related operation, a blinding operation and a permutation operation;

sending the transformed computational task to the at least one additional machine for execution;

receiving one or more results of the transformed computational task in the originator machine; and transforming the one or more results of the transformed computational task in the originator machine in a manner which permits verification that the one or more results are appropriate results for the given input.

2. The method of claim 1 wherein the computational task associated with the cryptographic protocol comprises an exponentiation operation.

3. The method of claim 1 wherein the cryptographic protocol comprises a digital signature protocol.

4. The method of claim 1 wherein at least a subset of the originator machine and the at least one additional machine each comprise one or more servers associated with a computer network.

5. The method of claim 1 wherein the originator machine and the at least one additional machine communicate over a network.

6. The method of claim 1 wherein the originator machine includes a card reader configured to read information relating to the cryptographic protocol from a smart card.

7. The method of claim 1 wherein the blinding operation is applied to an output of the error-related operation, and the permutation operation is applied to an output of the blinding operation.

8. The method of claim 1 wherein the error-related operation comprises a replication operation and a dependency operation.

9. The method of claim 8 wherein the dependency operation is applied to an output of the replication operation.

10. The method of claim 1 wherein the computational task to be transformed is a request to compute $(g^{k_1}, \ldots, g^{k_n})$ denoted by a vector $G_1=(k_1, \ldots, k_n)$ where g denotes a generator and $k_1, \ldots, k_n$ denote portions of a secret key associated with the cryptographic protocol.

11. The method of claim 1 wherein the error-related operation includes one or more replication operations.

12. The method of claim 1 wherein the error-related operation includes a replication operation in which a first vector $G_1=(k_1, \ldots, k_n)$ is transformed into a second vector $$G_2=(k_1, \ldots k_n, k_{n+1}, k_1, \ldots, \ldots, k_n, k_{n+1}, k_1, \ldots, k_n, k_{n+1}).$$

13. The method of claim 1 wherein the error-related operation includes a dependency operation in which dependencies are introduced between two or more computational tasks.

14. The method of claim 1 wherein the error-related operation includes a dependency operation in which dependencies are introduced transforming a computational task involving a set of exponents $k_1, \ldots, k_n$ into a task involving the exponents $k'_1, \ldots, k'_n$, where $$k'_i = \begin{cases} k_1 & : i = 1 \\ k_i + \alpha \cdot k_{i-1} + \beta \cdot k'_{i-1} \bmod q & : 1 < i \leq n \end{cases}.$$

15. The method of claim 1 wherein the blinding operation for a vector $(k_1, \ldots, k_n)$ is implemented by first choosing e random numbers $$r_1, \ldots r_e \in \left\{0, \ldots, \frac{q-1}{2}\right\},$$

and then, for each element $k_j$ with $1 \leq j \leq n$, d elements are chosen and elements of a new vector are computed as $$k'_j = k_j - \sum_{i=1}^{e} \gamma_{i,j} r_i \mod q$$

where $\gamma_{i,j} \in \{0, 1\}$ and $$\sum_{i=1}^{e} \gamma_{i,j} = d.$$

16. The method of claim 1 wherein the permutation operation comprises applying a permutation Π selected uniformly at random to a vector output of the blinding step to generate a new vector corresponding to the transformed computational task.

17. The method of claim 1 wherein the results of the transformed computation are transformed by inversion of the permutation operation followed by inversion of the blinding operation, and the transformed results are verified based on information associated with the error-related operation.

18. An apparatus for performing a computational task associated with a cryptographic protocol in a distributed manner using a plurality of machines, the plurality of machines comprising an originator machine and at least one additional machine, the apparatus comprising:

a processor associated with the originator machine and operative to transform a computational task involving a given input in the originator machine, the transforming of the computational task involving at least an error-related operation, a blinding operation and a permutation operation, to send the transformed computational task to the at least one additional machine for execution, to receive one or more results of the transformed computational task, and to transform the one or more results of the transformed computational task in a manner which permits verification that the one or more results are appropriate results for the given input; and a memory coupled to the processor for at least temporarily storing at least a portion of the results of the transformed computational task.

19. A computer-readable medium containing one or more programs for performing a computational task associated with a cryptographic protocol in a distributed manner using a plurality of machines, the plurality of machines comprising an originator machine and at least one additional machine, wherein the one or more programs when executed in a processor provide the steps of:

transforming a computational task involving a given input in the originator machine, the transforming of the computational task involving at least an error-related operation, a blinding operation and a permutation operation;

sending the transformed computational task to the at least one additional machine for execution;

receiving one or more results of the transformed computational task in the originator machine; and transforming the one or more results of the transformed computational task in the originator machine in a manner which permits verification that the one or more results are appropriate results for the given input.

* * * * *

UNITED STATES PATENT AND TRADEMARK OFFICE
CERTIFICATE OF CORRECTION

PATENT NO. : 6,950,937 B2
DATED : September 27, 2005
INVENTOR(S) : B.M. Jakobsson et al.

It is certified that error appears in the above-identified patent and that said Letters Patent is hereby corrected as shown below:

Column 5,
Line 45, delete the italicized subscript "I" and insert subscript -- i --.

Column 12,
Lines 32, 33, 40, 42, 51, 52 and 59, delete the italicized subscript "I" and insert subscript -- 1 --.

Signed and Sealed this

Twentieth Day of December, 2005

JON W. DUDAS
*Director of the United States Patent and Trademark Office*